United States Patent
Wang et al.

(10) Patent No.: US 10,149,119 B2
(45) Date of Patent: Dec. 4, 2018

(54) PROVIDING MULTIPLE CONTENT ITEMS FOR DISPLAY ON MULTIPLE DEVICES

(71) Applicant: Intel Corporation, Santa Clara, CA (US)

(72) Inventors: Jerry C. Wang, Shanghai (CN); Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 15/234,950

(22) Filed: Aug. 11, 2016

(65) Prior Publication Data

US 2016/0353255 A1    Dec. 1, 2016

Related U.S. Application Data

(63) Continuation of application No. 13/993,654, filed as application No. PCT/CN2012/087285 on Dec. 24, 2012, now Pat. No. 9,432,201.

(51) Int. Cl.
*H04W 4/06* (2009.01)
*G06F 3/14* (2006.01)
(Continued)

(52) U.S. Cl.
CPC ............... *H04W 4/06* (2013.01); *H04L 12/18* (2013.01); *H04L 12/185* (2013.01);
(Continued)

(58) Field of Classification Search
CPC ...... H04W 4/06; H04W 28/065; H04L 69/16; H04L 69/22; H04L 12/185; H04L 12/1827; H04L 12/18
See application file for complete search history.

(56) References Cited

U.S. PATENT DOCUMENTS

| 2004/0165015 A1 | 8/2004 | Blum et al. |
| 2005/0015506 A1 | 1/2005 | Padborg |

(Continued)

FOREIGN PATENT DOCUMENTS

| CN | 101068225 A | 11/2007 |
| CN | 102231807 A | 11/2011 |

OTHER PUBLICATIONS

International Search Report and Written Opinion dated Sep. 26, 2013 for International Application No. PCT/CN2012/087285, 10 pages.

(Continued)

*Primary Examiner* — Kiet Tang
(74) *Attorney, Agent, or Firm* — Schwabe, Williamson & Wyatt, P.C.

(57) ABSTRACT

Embodiments of methods, systems, and storage medium associated with providing, with a user device, multiple content items for display by multiple receiving devices via multicast transmissions are disclosed herein. In one instance, the method may include forming a multicast data unit with multiple portions of data. Each portion of data may correspond to one of multiple content items to be transmitted to multiple receiving devices by the computing device and each content item is to be displayed by one of the multiple receiving devices. The method may further include transmitting the formed multicast data unit to the multiple receiving devices; and initiating, at each receiving device of the multiple receiving devices, a retrieval from the multicast data unit a portion of data that corresponds to a content item to be displayed by the receiving device, and to display the content item. Other embodiments may be described and/or claimed.

21 Claims, 7 Drawing Sheets

(51) Int. Cl.
    *H04N 21/235*    (2011.01)
    *H04L 12/18*     (2006.01)
    *H04L 29/06*     (2006.01)
    *H04W 28/06*    (2009.01)

(52) U.S. Cl.
    CPC .......... *H04L 12/1827* (2013.01); *H04L 69/16* (2013.01); *H04L 69/22* (2013.01); *H04W 28/065* (2013.01)

(56) References Cited

U.S. PATENT DOCUMENTS

| | | | |
|---|---|---|---|
| 2006/0161948 A1* | 7/2006 | Hwa | G06F 3/1446 725/37 |
| 2008/0172708 A1 | 7/2008 | Perry et al. | |
| 2009/0067533 A1 | 3/2009 | Yuan et al. | |
| 2010/0109974 A1* | 5/2010 | Dunn | H04N 21/235 345/3.1 |

OTHER PUBLICATIONS

International Preliminary Report on Patentability dated Jul. 9, 2015 for International Application No. PCT/CN2012/087285; 6 pages.
Extended European Search Report dated Jul. 4, 2016 for European Application No. 12891001.5, 10 pages.
Non-Final Office Action dated Aug. 14, 2015 for U.S. Appl. No. 13/993,654, 16 pages.
Final Office Action dated Feb. 10, 2016 for U.S. Appl. No. 13/993,654, 22 pages.
Notice of Allowance dated Apr. 28, 2016 for U.S. Appl. No. 13/993,654, 17 pages.
Notice of Allowance dated Aug. 3, 2016 for U.S. Appl. No. 13/993,654, 4 pages.

* cited by examiner

PROVIDING MULTIPLE CONTENT ITEMS FOR DISPLAY ON MULTIPLE DEVICES

CROSS REFERENCE TO RELATED APPLICATIONS

The present application is a continuation of U.S. application Ser. No. 13/993,654, filed Jan. 24, 2014, entitled "PROVIDING MULTIPLE CONTENT ITEMS FOR DISPLAY ON MULTIPLE DEVICES" which is a national phase entry under 35 U.S.C. § 371 of International Application No. PCT/CN2012/087285, filed Dec. 24, 2012, entitled "PROVIDING MULTIPLE CONTENT ITEMS FOR DISPLAY ON MULTIPLE DEVICES", which designated, among the various States, the United States of America. The Specification of the PCT/CN2012/087285 and U.S. patent application Ser. No. 13/993,654 Applications are hereby incorporated by this reference and this application claims the benefit of these applications, for all purposes.

FIELD

Embodiments of the present disclosure generally relate to the field of data communication, and more particularly, to techniques for provisioning multiple contents for display on multiple devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many current wireless network display solutions, e.g., named Wi-Fi display functions, enable content displayed on a screen of a computing device, such as laptop, to be displayed on another device, such as a display monitor. The solution may be extended to enable project content displayed e.g., on a laptop screen, to be displayed on multiple display monitors. When it is desired to display two or more content items displayed on a laptop screen (e.g., a window displaying a document and another window displaying a Web site), separate laptop/monitor pairs may have to be used, with each laptop/monitor pair operating a Wi-Fi display function based communication session independently. For example, a presenter in a seminar or a meeting may use one laptop to wirelessly project a PowerPoint presentation to one monitor and another laptop to wirelessly project a demo application to another monitor. An attempt to provide multi-content display to multiple monitors using a single computing device (e.g., laptop) may result in multiple video streams competing against each other and consequently high display latency on all receiving monitors due to high queuing delays, as well as limited bandwidth for other devices that may be connected to the same network.

In general, the latest advancements in information technology may not always provide an easy mechanism to enable multiple content items be displayed on multiple receiving devices using a single computing device as a source providing the multiple content items.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for displaying two or more content items on separate receiving devices, such as display monitors or any other display devices, where the content items are provided by a single computing device, e.g., user device, via a multicast transmission. The described techniques enable displaying each content item on a corresponding receiving device.

In some embodiments, the user device may identify content items to be displayed by receiving devices. The user device may further identify available receiving devices and designate particular content items among the identified content items to be displayed by a particular receiving device among the identified devices. The user device may form a multicast transmission to be sent to all designated receiving devices. The multicast transmission may include multiple portions of data, each portion corresponding to one of the identified content items. The user device may then transmit the formed multicast transmission to all designated receiving devices. Each designated receiving device may be configured to identify, retrieve, and process the data portion corresponding to a content item designated for display on that device. The receiving device then may display the designated content item based on the retrieved and processed data portion.

In some embodiments, the user device may be configured to receive a selection of content items to be displayed from a user. In some embodiments, the user device may be configured to receive a selection of receiving devices from the user. The user device may be configured to receive designations from the user regarding which receiving device may display which content items selected by the user or otherwise identified by the user device. The selections of receiving devices, content items, and designations of content items to corresponding user devices may be provided, for example, via a user interface associated with an application configured to perform the above-described techniques for displaying two or more content items on separate receiving devices.

Figure 1:
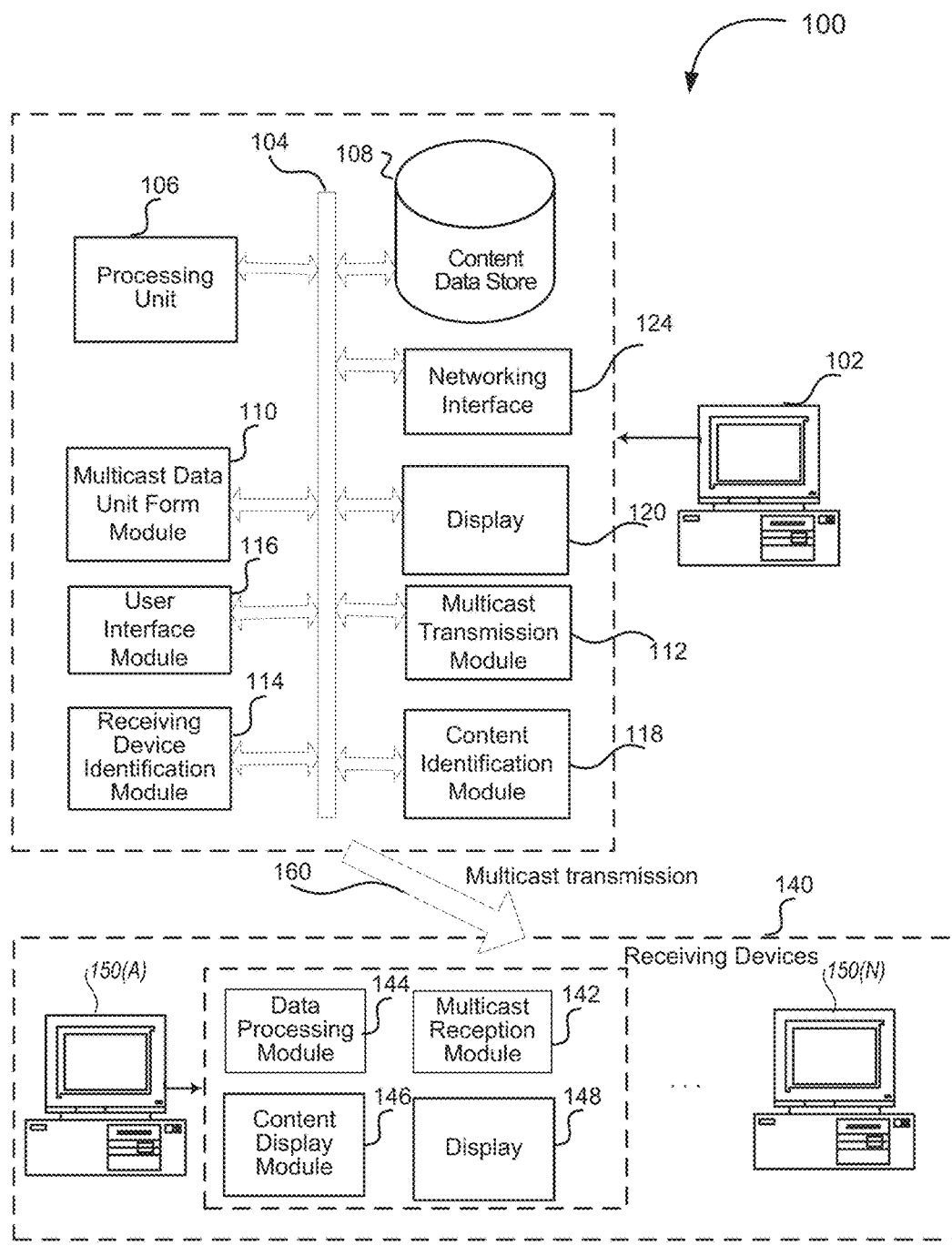
FIG. 1 illustrates an example environment 100 in which the techniques for providing multiple content items from a user device for display on separate receiving devices described herein may be practiced in accordance with various embodiments.

FIG. 1 is a block diagram of an example environment 100 in which the techniques described herein may be practiced. The environment 100 may include a user (computing) device 102 configured to provide multiple content items for display on corresponding receiving devices, such as monitors. The user device 102 is not limited to the components described herein; other suitable configurations of the user devices using different components may be used without departing from the spirit of the present disclosure. For example, some components or functions performed by the device 102 may reside on, or performed by, one or more server devices. The user device 102 may include any computing device, such as a laptop, desktop, smartphone, tablet personal computer (PC), ultrabook, and the like.

For the illustrated embodiments, the user device 102 may include a number of components coupled, for example, via an interconnect 104. In one example, the interconnect 104 may include one or more buses. Examples of suitable buses may include, but not limited to, Peripheral Component Interconnect (PCI) buses, Universal Serial Buses (USB), and so forth. The user device 100 may include one or more processing units 106, each having a processor and a memory. Each processor may be a single or multi-core processor. The memory may be volatile or non-volatile, single level or hierarchical. In alternate embodiments, the processing unit(s) 106 may share memory. The processing unit 106 may be associated with a data store 108 configured to store various types of data. For example, the data store 108 may store specific data related to the multiple content items to be provisioned by the user device 102 for display on a set of multiple receiving devices 140. In another example, the data store 108 may store information associated with identified receiving devices 150(A)-150(N) of the set 140.

The data store 108 may be any one of a number of optical, magnetic or solid-state mass storage devices. In another example, the data store 108 may reside at a remote server or in a "cloud" computing environment. The data store 108 may also store computer-executable instructions that may cause the device 102, when executed by processing unit 106, to perform one or more of the operations described below in reference to the device's components.

For the embodiments, the data store 108 may include computer-executable instructions that, when executed on the processing unit 106, may cause the device 102 to identify each of multiple receiving devices 150(A)-150(N) using a receiving device identification module 114. The identification of the receiving devices may be done via initial communication procedures between the user device 102 and the receiving devices 150(A)-150(N), such as a handshake communication procedure. As a result of the identification, for example, each receiving device's unique identifier may become known at the user device 102.

The computer-executable instructions, when executed on the processing unit 106, may cause the device 102 to receive a user selection of content items to be displayed on the receiving devices 150(A)-150(N), such as via a user interface module 116, or otherwise identify the content items to be displayed on the receiving devices 150(A)-150(N) such as with a content identification module 118.

In some embodiments, the computer-executable instructions may be stored on data store 108 or another, e.g., remote data store and executed, for example, on a server supporting the user device 100 described herein. Generally, the instructions may be distributed among the user device 102 and/or other computing devices so as to facilitate dialogs between the environment 100 components in order to make informed decisions.

For the embodiments, the data store 108 may include computer-executable instructions that, when executed on the processing unit 106, may cause the device 102 to form multicast data units associated with multiple contents by combining data portions each associated with the content item to be transmitted in a multicast transmission 160 by a multicast transmission module 112 to the receiving devices 150(A)-150(N). The instructions configured to cause the device 102 to form multicast data units may comprise a multicast data unit form module 110. Each data portion in the multicast data unit may be assigned a value (e.g., an offset associated with a data packet comprising the data portion). The offset value may be associated with a receiving device's unique identifier that may be also included in a multicast data unit. The receiving device unique identifier and associated offset value may be recognized by a receiving device as pertaining to a content item to be displayed by the receiving device. The value may be added to the data portion as a result of a designation of a content item by a user, via a user interface module 116, or via the content identification module 118.

The user device 102 may further include one or more components, such as a display 120, for example, a touch-sensitive screen configured to receive user input via touch and/or gesture, and display multiple content items to a user, such as Web pages, documents in different formats, images, video images, and the like. The user may select, e.g., via the user interface module 116, from the content items displayed on the display 120, the content items to be displayed by the receiving devices 150(A)-150(N).

The user device 102 may further include a networking interface module 124 configured to facilitate communications with other devices, e.g., other computing devices, servers, and the like (not shown). Communications between the user device 102 components, and/or between the user device 102 and other computing devices may occur via one or more wired or wireless, private or public networks, such as Internet. An example of a wired network may be an Ethernet network. Examples of wireless network may include, but are not limited to, Bluetooth®, WiFi® (in accordance with one of Institute of Electrical Engineer's (IEEE) 802.11 standards), or 3G/4G and beyond wireless communication networks.

Each of the receiving devices 150(A)-150(N) in the receiving device set 140 may include any display device, such as a display monitor, and may be configured to identify, or register, with the user device 102, for example, via a handshake communication in accordance with a handshake communication protocol. As a result of such identification, the receiving device unique identifier may be provided to the user device 102. Each of the receiving devices 150(A)-150 (N) may be further configured to receive multicast transmissions 160 from the user device 102, process the received transmission to identify a data portion corresponding to a content item designated to be displayed by the receiving device, process (e.g., retrieve) the identified data portion, and display corresponding content on the receiving device.

Accordingly, each receiving device 150(A)-150(N) may include a multicast reception module 142 configured to receive multicast transmissions 160 from the user device 102. Each receiving device 150(A)-150(N) may further include a data processing module 144 configured to process the received multicast transmissions 160, such as identify and retrieve from the received multicast data unit (e.g., data frame) a data portion (e.g., data string) corresponding to the content item designated to be displayed by the receiving device. The identification of a pertinent data portion may be based on a receiving device unique identifier included in the data portion that may be recognized by the receiving device, and an associated data portion offset value. Each receiving device 150(A)-150(N) may further include a content display module 146 configured to display the designated content item based on the data portions corresponding to the content item designated for the receiving device. The content item may be display on a receiving device display 148.

Figure 2:
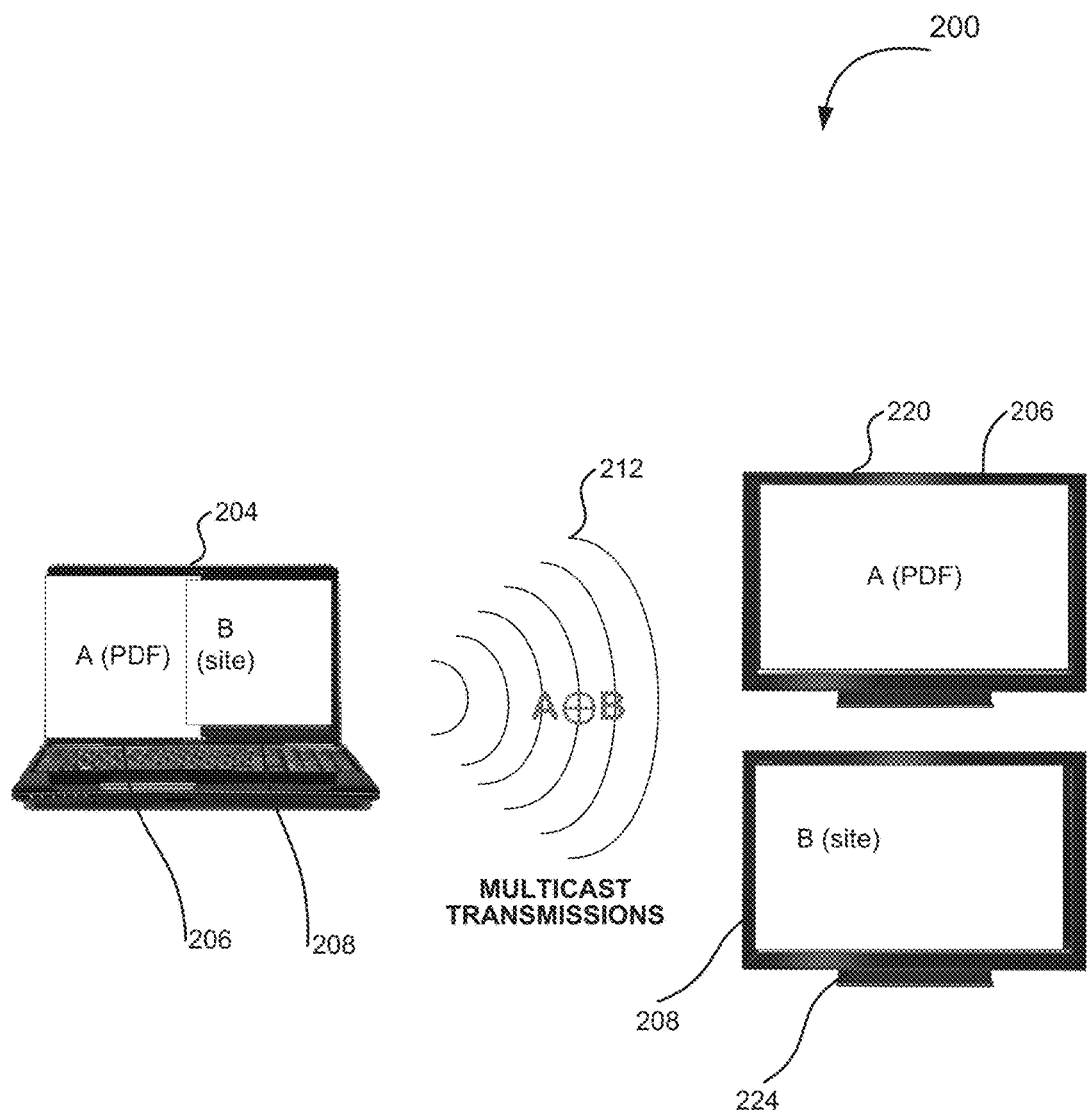
FIG. 2 illustrates an example diagram illustrating techniques for providing multiple content items from a user device for display on separate receiving devices in accordance with various embodiments.

FIG. 2 is an example diagram 200 illustrating techniques for providing multiple content items from one source (e.g., user device) for display on separate receiving devices. The exemplary diagram 200 may include a user device 204 displaying two different content items, content item A 206 and content item B 208. In one example, the user may select the content items to be displayed on the user device 204, e.g., by opening up a document in one window and a browser in another window on the user device display screen. In the case of two content items to be displayed by two separate receiving devices, the described techniques may be called a "dual screen Wi-Fi display solution." However, it should be understood that a number of content items may not be limited to two items only; two or more items may be provided by a single user device for display on separate receiving devices. As shown, the content item A 206 may be a PowerPoint® presentation and the content item B 208 may be a Web site displayed via a browser. Generally, any type of content (text files in different formats, images, video images, Web pages, diagrams, slide presentations, and the like) may be selected and displayed on the user device 204.

As described above, the user device 204 may be configured to identify available receiving devices, e.g., via a handshake communication. In the example diagram 200, two receiving devices are shown, a first receiving device 220 and a second receiving device 224. The receiving devices may be any devices configured to register with the user device 204; identify, retrieve, and process data portions corresponding to a content item designated for display on a particular receiving device; and display the designated content item based on the processed data. The receiving devices may be selected from any computing devices equipped with display monitors, such as laptops, desktops, intelligent display monitors, mobile devices, smartphones, tablet PCs, and the like.

The user device 204 may be configured to form multicast data units based on the content items 206 and 208 selected for display by the devices 220 and 224 as described in reference to FIG. 1. Specifically, the formed multicast data units may include data portions corresponding to content A 206 and content B 208 combined in a multicast transmission unit (A+B) as discussed above. The formed multicast data units may further include receiving devices' unique identifiers and associated values (e.g., offset values) identifying data portions designated for the device with the unique identifier. The user device 204 may be further configured to initiate a multicast transmission 212 that includes the formed multicast data units to the receiving devices 220 and 224.

As discussed above, the multicast transmission 212 initiated by the user device 204 may be received by multiple receiving devices. The first receiving device 220 may be configured to identify, retrieve, and process data portions corresponding to content item A 206. The second receiving device 224 may be configured to identify, retrieve, and process data portions corresponding to content item B 208. For example, each receiving device 220 and 224 may select their designated data portions by recognizing their unique identifiers and corresponding values (e.g., data portion offset) associated with the designated data portion. The receiving devices 220 and 224 may also select their respective data portions by decoding the data portion with their unique code or collecting data from a specified data portion offset. Thus, each device 220 and 224 may select and retrieve from the multicast transmission 212 a designated data portion from the multicast data unit.

In some embodiments, a user may designate the device 220 to display the content item A 206 and the device 224 to display the content item B 208, for example, via a user interface provided to the user device 204 (not shown). Accordingly, as shown, the content item A 206 may be displayed by the receiving device 220 and the content item B 208 may be displayed by the receiving device 224.

Figure 3:
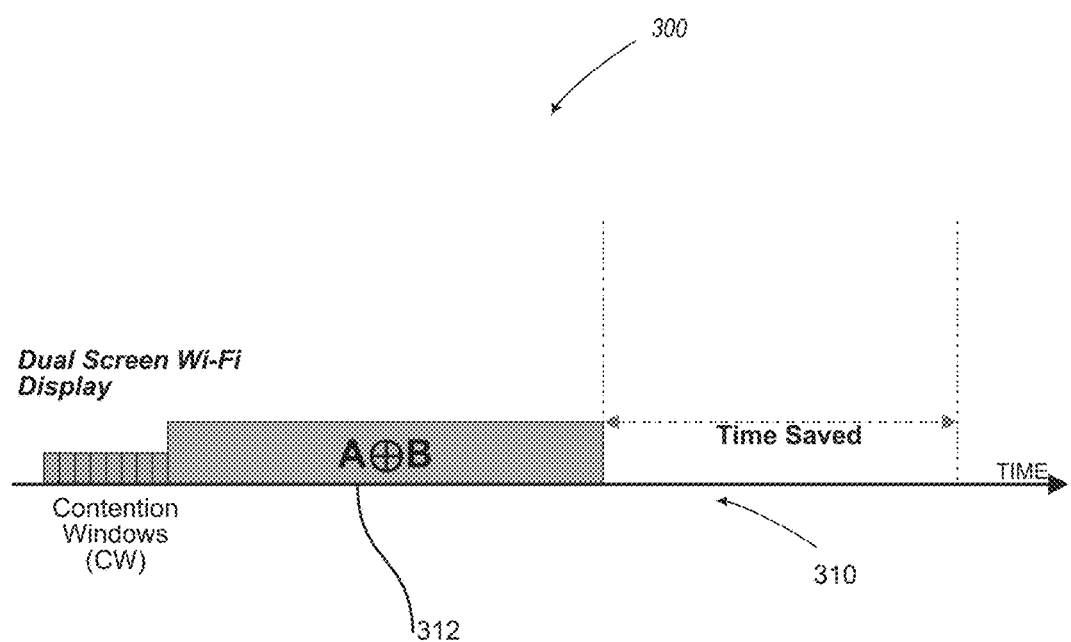
FIG. 3 illustrates an example data transmission utilized by the techniques for providing multiple content items from one source for display on separate receiving devices in accordance with various embodiments.

FIG. 3 illustrates an example data transmission 300 utilized by the techniques for providing multiple content items from one source (e.g., user device) for display on separate receiving devices. As those skilled in the art would appreciate, the data transmission in a conventional data transmission that provides for displaying two content items A and B by two different receiving devices using a standard Wi-Fi display function typically includes two separate unicast transmissions (frames), to achieve a dual screen display of the content items A and B. Two separate unicast transmissions may require two different transmission sources, such as two separate user devices (e.g., laptops, desktops, or the like), each running a Wi-Fi display function independently, in order to provide a display of the content items A and B by two separate receiving devices. In other words, two separate unicast transmissions may require two separate pairs of transmission sources and receiving devices.

Each unicast frame typically includes data portions corresponding to respective content items A and B. The unicast transmission may further include "Acknowledgement" (ACK), an indication of successful data transmission from the receiving side. The unicast transmission may further include "Short Inter-Frame Spacing" (SIFS), a minimum time interval between successive data transmissions. The unicast transmission may further include "Distributed Inter-Frame Space" (DIFS), a time interval between the data frame and its acknowledgement (ACK). The unicast transmission may further include "Contention Windows" (CW), a random period that a transmission source (e.g., one of laptops in a pair) must wait before attempting to access a wireless medium and prevent collisions with other transmission sources.

In embodiments, the data transmission 300 may be utilized by the techniques for providing multiple content items from one source (e.g., user device) for display on separate receiving devices. As discussed above, the techniques may be practiced as dual-screen Wi-Fi display solution in case of two content items to be displayed by two devices as illustrated by FIGS. 2 and 3. The data transmission 300 may provide for carrying both video streams (each corresponding to a content item A or B) in one multicast frame A+B 312.

As those skilled in the art would appreciate, the data transmission 300, if compared to the conventional unicast data transmission, may show significant time reduction (indicated by the sign "time saved" and numeral 310). Specifically, by virtue of a multicast transmission, a combined multicast stream A+B 312 combining data frames corresponding to the content items A and B may arrive at receiving devices at approximately the same time. Furthermore, the data transmission 310 may not include extra time needed for acknowledgment ACK, SIFS, and/or DIFS as required by conventional unicast transmission. Accordingly, the multicast transmission may be more suitable for real-time content streaming with bounded delay, for example, for User Datagram Protocol (UDP) streaming.

As there may be no significant delay between two concurrent content (e.g., video) streams corresponding to the content items A and B, both receiving devices displaying the content items A and B respectively may be synchronized with less jitters and practically without interfering with one another. As a result, the described dual-screen Wi-Fi display techniques may prove more effective than a conventional method with two separate unicast Wi-Fi display sessions described above in reference to the conventional unicast data transmission.

Figure 4:
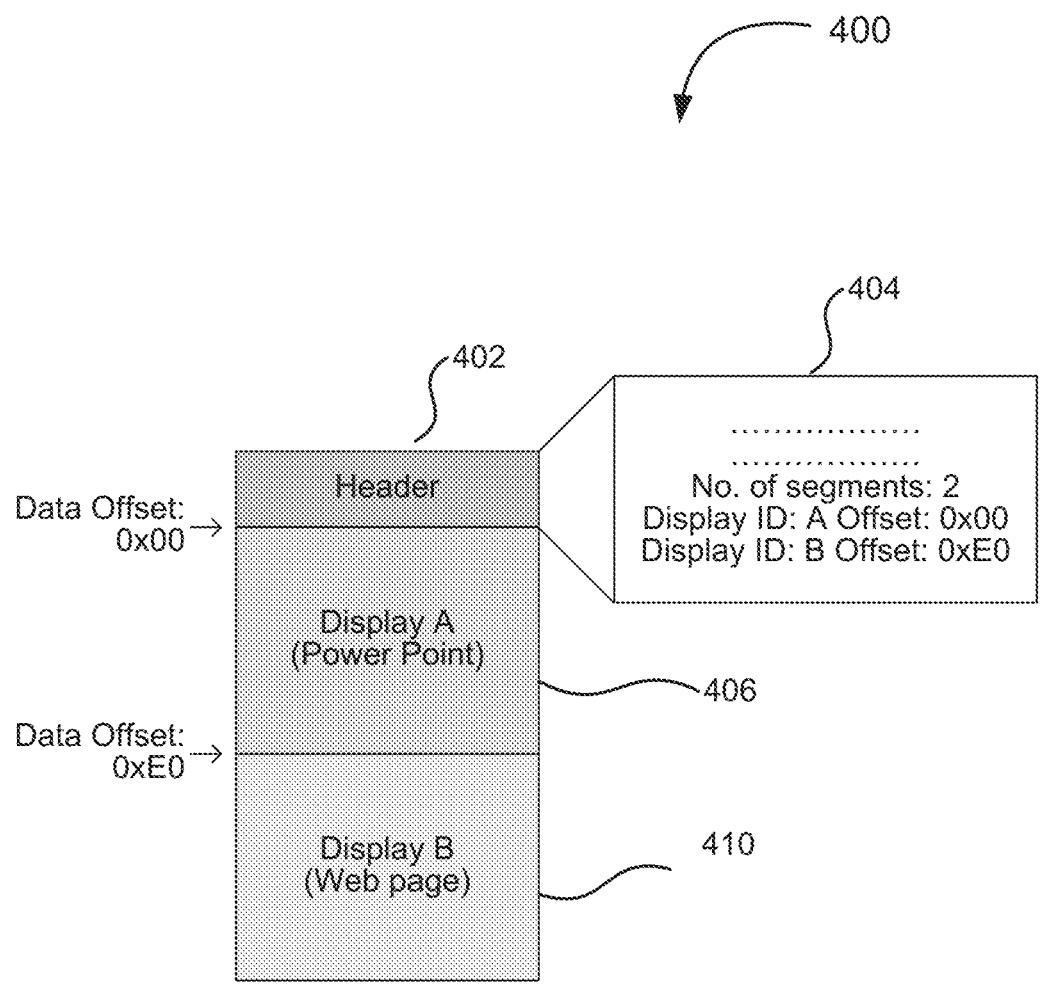
FIG. 4 illustrates an example multicast transmission data unit used for multicast transmission of two data portions, in accordance with various embodiments.

FIG. 4 illustrates an example multicast transmission unit (e.g., packet) 400 used for multicast transmission of two data portions, each associated with a different content item.

As described above, upon the completion of am initial handshake communication between a user device and receiving devices (e.g., display monitors), the user device may have the knowledge on display monitors available for display and their respective device identifiers (unique IDs). This unique ID may be associated with the receiving device rather than the content to be displayed on that receiving device. The user may determine and assign the contents to be display on the receiving devices (monitors). In other words, the monitors may display whatever data transmitted to them in a multicast transmission rather than having knowledge on the content item to be displayed. Accordingly, the user device may switch the content items between receiving devices when required.

Each multicast data unit (packet) may contain a header section that may specify the intended recipients (receiving devices) and their respective data portions. Upon reception of a multicast packet, the receiving device, e.g., a display monitor may retrieve its data portion by examining the packet header. FIG. 4 illustrates an example of such multicast packet 400. Assume one content item to be displayed on a display monitor A is a PowerPoint® presentation and another content item is a Web site (page) to be displayed on a display monitor B as described in reference to FIG. 2.

As shown, the packet 400 may be split into two data portions and destined to different display monitors, A and B. The packet header 402 may specify the number of segments the packet contains, and its intended recipients, as illustrated by header data 404. For example, the header data 404 may specify that there are two data portions (segments) included in the packet. The header data 404 may further indicate a unique identifier associated with the display monitor A and a data portion (segment) offset value (e.g., offset 0x00) associated with that unique identifier. The header 402 may further indicate a unique identifier associated with the display monitor B and a data portion (segment) offset value (e.g., offset 0xE0) associated with that unique identifier.

Each display monitor A and B may determine, from the header 402, to be a recipient of a data portion associated with content by analyzing the header, and may be capable to retrieve the data portion designated to this particular display from the specified data/packet location. In some embodiments, the data portions may be retrieved by using a unique hashing function if data portions are carried through network coding.

Based on the analysis of the header data 404, the display monitor A may determine that the data portion 406 associated with the PowerPoint® presentation is designated for that monitor, and retrieve that data portion. Similarly, based on the analysis of the header data 404, the display monitor B may determine that the data portion 410 associated with the Web page is designated for that monitor, and retrieve that data portion.

Figure 5:
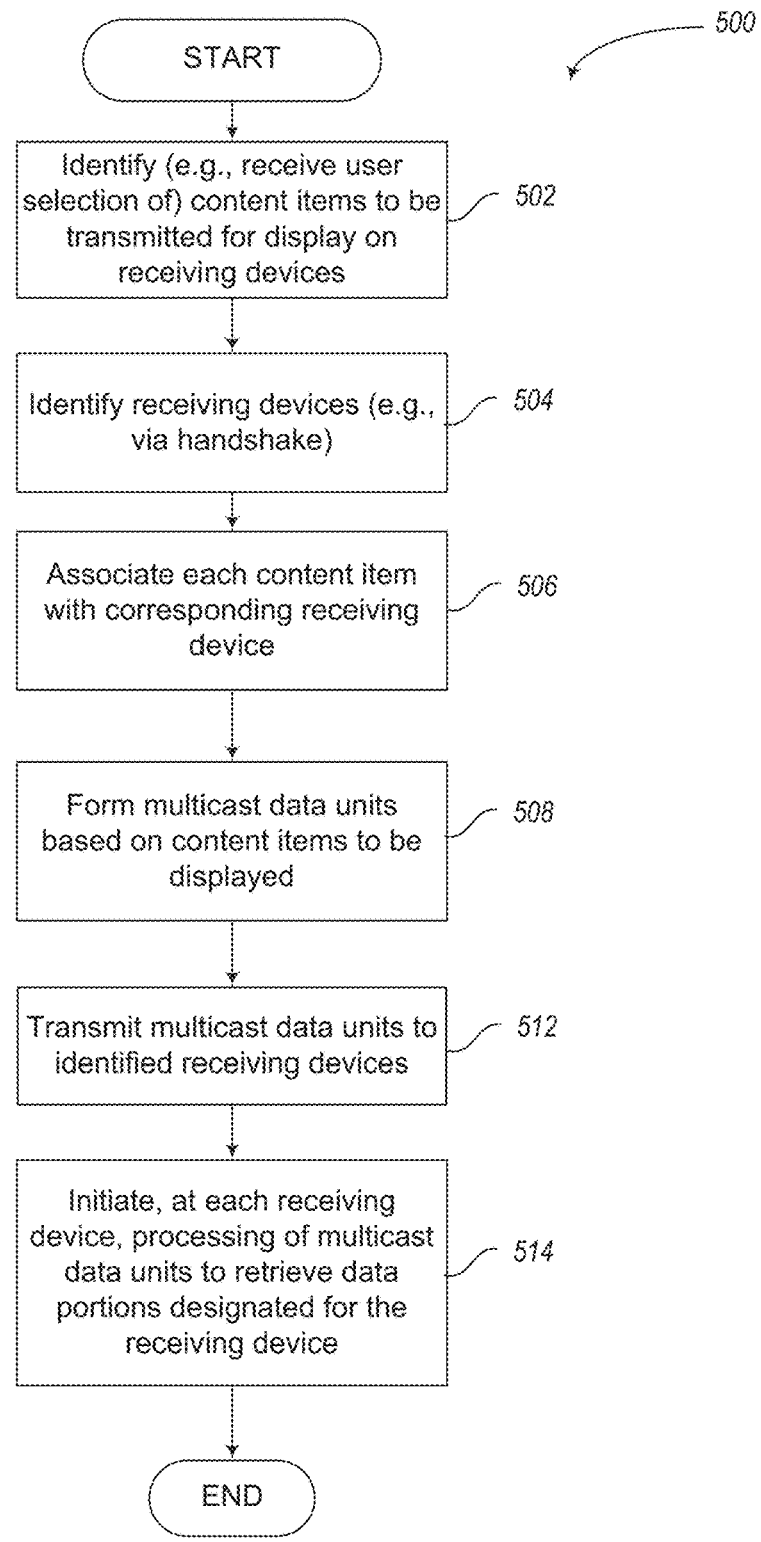
FIG. 5 illustrates a process flow diagram for providing a display of multiple content items to multiple receiving devices via a multicast transmission from a user device in accordance with various embodiments.

FIG. 5 illustrates a process flow diagram for providing a display of multiple content items to multiple receiving devices via a multicast transmission from a single user device in accordance with various embodiments. The process 500 may begin at block 502, where the user device may identify the content items that are to be displayed on multiple receiving devices. For example, the user device may receive a user selection of two or more content items (e.g., PowerPoint® presentations, Web sites, text files, video and photo images, and the like). In some embodiments, the user device may display the selected content items, for example, in separate windows associated with the device user interface. For example, the user device may display a browser rendering contents of a Web site in one window and a PowerPoint® presentation in another window.

At block 504, the user device may identify receiving devices available for receiving multicast transmissions from the user device. For example, receiving device identification or registration with the user device may take a form of a handshake communication procedure. Once the available receiving devices are identified, the user device may provide information regarding available receiving devices to the user, for example, via a user interface configured to provide receiving device information.

At block 506, the user device may associate each content item to be displayed with a receiving device, which accordingly may be designated to display the content item. In one example, the user may associate the content items with corresponding receiving devices. For example, referencing FIG. 2, the user may indicate, e.g., via the user interface, that the content 206 displayed by a window on the user device 204 be displayed by the receiving device 220. The user may further indicate that the content 208 displayed by another window on the user device 204 be displayed by the receiving device 224. Thus, the user may assign content to be displayed to a particular receiving device.

At block 508, the user device may form multicast data units based on the content items to be displayed on the designated receiving devices. For example, the multicast data units may be formed by combining data portions associated with the content items to be transmitted for display by the receiving devices as described in reference to FIG. 3. For example, for content items A and B to be displayed on two separate receiving devices, a multicast frame may be formed to combine data portions associated with the content items A and B, such as A+B. Also, as a result of the indication or identification of the content items to be displayed as described in reference to block 506, the user device may cause unique identifiers of respective receiving devices (e.g., offsets described in reference to FIG.

4) to be associated with respective data portions for the content items to be displayed by the receiving devices.

At block 512, the user device may initiate transmission of formed multicast data units to all designated receiving devices. As described in reference to FIGS. 2 and 3, the same multicast transmissions 212 may be transmitted to both receiving devices 204 and 224. In embodiments, the user device may interleave the formation of the multicast data units and their transmissions.

At block 514, the user device may initiate, at each receiving device, processing of multicast data units to retrieve data portions designated for each receiving device. In one example, such processing may be initiated by virtue of receiving, at the receiving devices, the multicast transmissions from the user device. Receiving and processing of the multicast transmissions sent by the user device is described in greater detail in reference to FIGS. 4 and 6. Generally, each receiving device may recognize the device's unique identifier and associated data portion offset. Based on that information, the receiving device may identify a data portion designated for that particular device, retrieve that data portion, and process the data portion so as to enable a display of the designated content item associated with the data portion. As a result of the receiving and processing, the designated content items may be displayed by respective receiving devices. For example, with reference to FIG. 2, the content item A 206 may be displayed by the receiving device 220, and the content item B 208 may be displayed by the receiving device 224.

Figure 6:
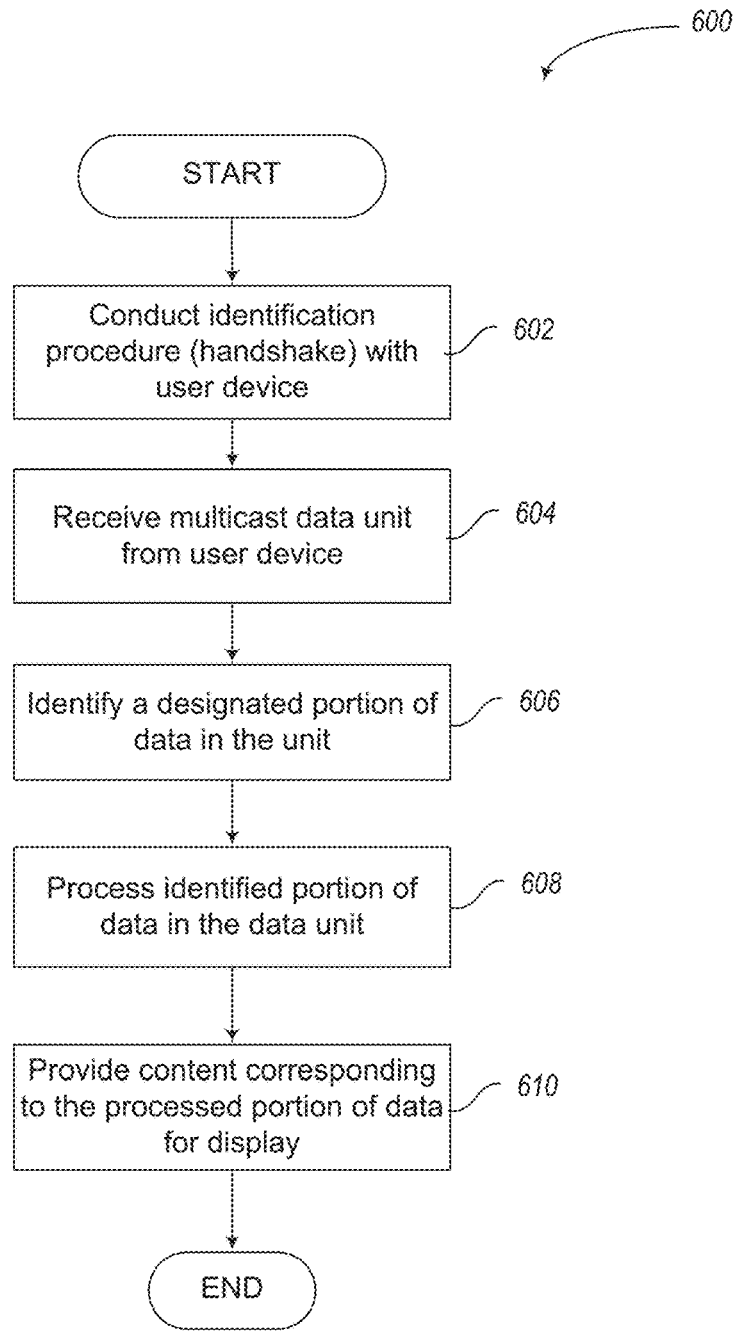
FIG. 6 illustrates a process flow diagram for providing a display of one of multiple content items at a receiving device via a multicast transmission received from a user device in accordance with various embodiments.

FIG. 6 illustrates a process flow diagram for providing a display of one of multiple content items at a receiving device via a multicast transmission received from a user device in accordance with various embodiments. The process 600 may begin at block 602, where a receiving device may identify, register, or otherwise authenticate itself with a user device. As described above, such identification may be implemented via a handshake communication procedure.

At block 604, the receiving device, among other receiving devices, may receive one or more multicast data units formed by, and transmitted from, the user device. At block 606, the receiving device may identify a data portion associated with the content item designated to be displayed at the receiving device. For example, the receiving device may analyze packet headers of the received multicast data units (packets) as discussed in reference to FIG. 4. If a header is determined to include a unique identifier associated with the receiving device and associated data portion offset, the receiving device may identify and retrieve the identified data portion based on the provided device unique identifier and corresponding data portion offset.

At block 608, the receiving device may process the retrieved data portion. For example, the receiving device may process the retrieved data as a part of a content data stream enabling a display of the content item by the receiving device. At block 610, receiving device may display the content item based on the processed content data.

Figure 7:
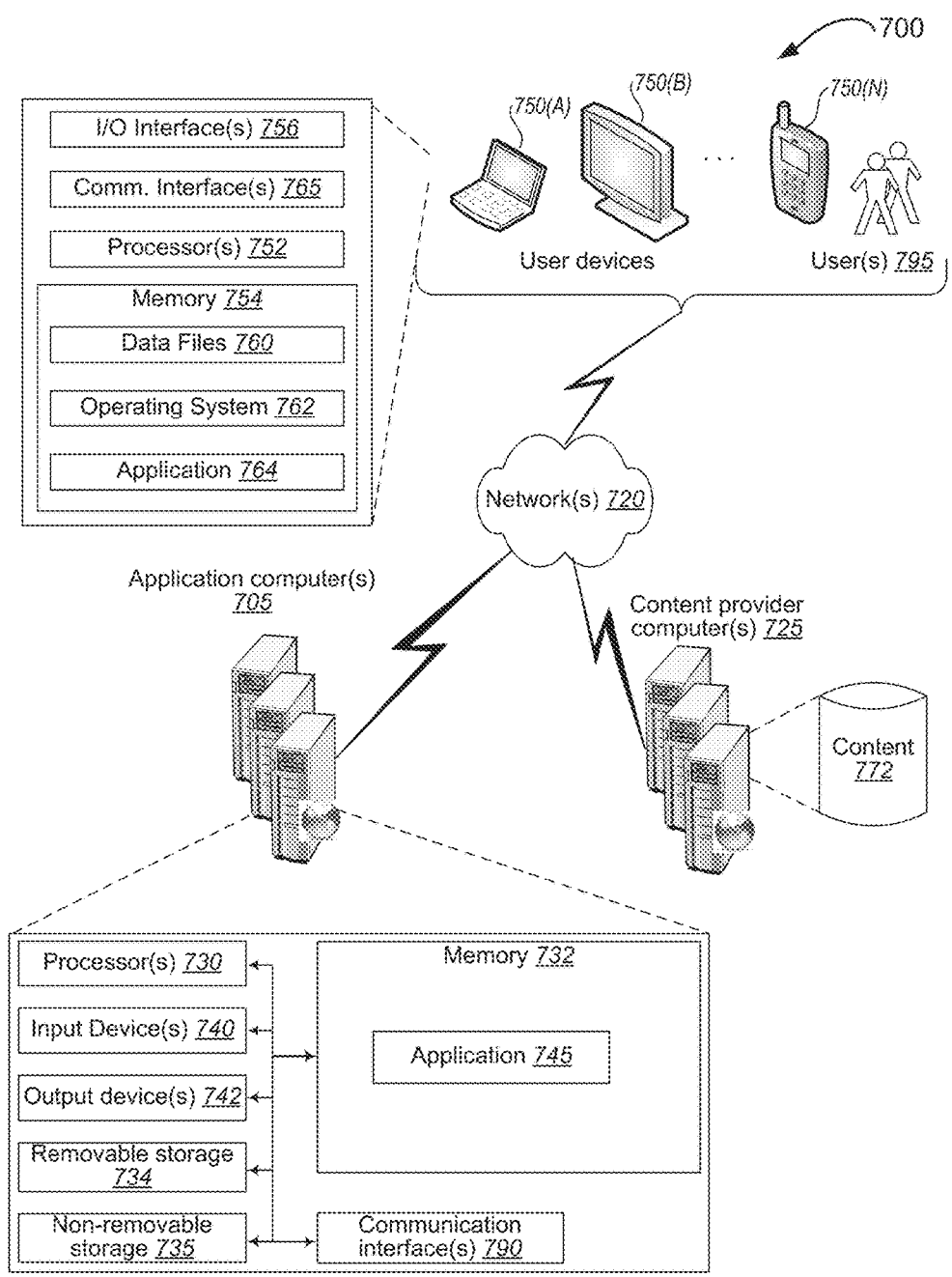
FIG. 7 illustrates an example environment suitable for implementing mediated embodiments for providing a display of multiple content items to multiple receiving devices via a multicast transmission from a user device in accordance with various embodiments.

FIG. 7 illustrates an example environment (e.g., system) 700 suitable for implementing mediated embodiments for providing a display of multiple content items to multiple receiving devices via a multicast transmission from a single user device in accordance with various embodiments. As will be appreciated, although a Web-based environment is used for purposes of explanation, different environments may be used, as appropriate, to implement various embodiments.

The environment 700 may include one or more user devices 750(A)-750(N) that may be associated with one or more users 795. Various devices 750(A)-750(N) may include computing devices equipped as earlier described with references to FIG. 1, and operable to enable multicast transmissions associated with multiple content items from one transmitting source, e.g., device 750(A) to multiple receiving devices, e.g., 750(B)-750(N). Each one of devices 750(A)-750(N) may include a processor 752 and memory 754 for storing processor-executable instructions, such as data files 760, operating system 762, and one or more applications 764, such as applications configured to enable the display of content items selected by one or more users 795 on the user device 750(A) on at least some of the receiving devices 750(B)-750(N), wherein each selected content item is displayed by a receiving device designated by the user 795 or by the applications 764, as described above in reference to FIGS. 1-6.

Each one of devices 750(A)-750(N) may further include at least one or both of the following elements: input/output interface 756 designed to enable peripheral component interaction with the system 700 and communication interface 765. In various embodiments, the input/output interface 756 may include, but is not limited to, a display, e.g., a liquid crystal display, a touch screen display, etc., a speaker, a microphone, a camera, and/or other components described in reference to FIG. 1. For embodiments including a display supporting touch screen features, the system 700 may include a touch screen controller for facilitating control of the display.

As discussed above, operating system 762 and/or an application 764 may include software components configured, when executed on the processor 752, to cause the system 700 to perform one or more operations, such as operations of content identification module 118, receiving device identification module 114, multicast data unit form module 110, multicast transmission module 112, multicast reception module 142, data processing module 144, content display module 146, and so forth, enabling display of content items provided by the user device 750(A) by multiple receiving devices (e.g., 750(B)-750(N)) via multicast transmissions as described above in reference to FIGS. 1-6.

The network 720 may include any appropriate network or networks, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In one example, the illustrative environment 700 may be configured to provide the capabilities described in reference to FIGS. 1-6. For example, user device 750(A) may be connected to receiving devices 750(B)-750(N) through a network described above, such as, for example, WiFi®. The devices 750(A)-750(N) may be also connected to application computer(s) 705 and content provider computer(s) (e.g., servers) 725 through the network described above, for example, the Internet.

For example, when the network may include the Internet, the environment may include one or more content provider servers 725 for receiving requests and serving content in response thereto, although for other networks, an alternative device serving a similar purpose could be used, as would be apparent to one of ordinary skill in the art. The illustrative environment 700 may also include at least one application computer (e.g., server) 705 including, or associated with, one or more processors 730, input devices 740, output devices 742 (e.g., administrative input/output devices), removable storage 734, and non-removable storage 735 that may be connected to a communication interface 790 and memory 732. Applications 745 may reside on the server 705 and execute thereon. In alternate embodiments, applications 745 may execute partly on the devices 750(A)-750(N) and partly on the server 705.

The handling of all requests and responses, for example, the requests for content initiated by the user 795 as well as the delivery of content items between the user device 750(A) and the application server 705, may be handled by one or more content provider Web servers 725. The content data store 772 may be associated with the server 725. The data store 772 is operable, through logic associated therewith, to receive instructions from the server 725 and obtain, update, or otherwise process data in response thereto.

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 700 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include disk drives, optical storage devices, and solid-state storage devices, such as random access memory (RAM) or read-only memory (ROM), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

In general, the environment (system) 700 may be a distributed interaction environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limited to the scope of the disclosure.

According to various embodiments, the present disclosure describes a computing device-readable storage medium comprising instructions stored thereon wherein the instructions, in response to execution by a computing device, may cause the computing device to form a multicast data unit with multiple portions of data, each portion of data corresponding to one of multiple content items to be transmitted to multiple receiving devices by the computing device, each content item to be displayed by one or more of the multiple receiving devices, and transmit the formed multicast data unit to the multiple receiving devices. Each receiving device may be configured to retrieve from the multicast data unit a portion of data that corresponds to a content item to be displayed by the receiving device, and to display the content item.

The instructions, in response to execution by the computing device, may further cause the computing device to identify each of the multiple receiving devices. The instructions, in response to execution by the computing device, may further cause the computing device to identify each of the multiple receiving devices via an initial handshake communication with the corresponding receiving device. The instructions, in response to execution by the computing device, may further cause the computing device to transmit the formed multicast data unit via a wireless network. The instructions, in response to execution by the computing device, may further cause the computing device to identify content items to be correspondingly displayed by the multiple receiving devices.

The instructions that cause the computing device to identify the content items, may further cause the computing device, in response to execution by the computing device, to receive selections of the content items to be displayed by the multiple receiving devices. The instructions, in response to execution by the computing device, may further cause the computing device to receive selections of the multiple receiving devices. The instructions, in response to execution by the computing device, further cause the computing device to designate each of the multiple receiving devices to receive a particular content item of the plurality of content items. The instructions, in response to execution by the computing device, may further cause the computing device to include in the multicast data unit identifiers, each identifier corresponding to one of the multiple receiving devices, or each identifier being associated with a portion of data corresponding to a content item to be displayed by one of the receiving devices. The computing device may be selected from at least one of a smartphone, a laptop, a desktop, a tablet personal computer, or an ultrabook.

According to various embodiments, the present disclosure describes a computing device-readable storage medium comprising instructions stored thereon, wherein the instructions, in response to execution by a receiving device, may cause the receiving device to receive, from a computing device, a multicast data unit including multiple portions of data, each portion of data corresponding to one of a plurality of content items to be transmitted by the computing device to multiple receiving devices, each content item to be displayed by one of the multiple receiving devices, the receiving device being one of the multiple receiving devices, and identify a portion of data in the multicast data unit that corresponds to a content item of the plurality of content items that is to be displayed by the receiving device to enable the content item to be retrieved and displayed.

The instructions, in response to execution by the receiving device, may further cause the receiving device to retrieve the identified portion of data from the multicast data unit. The instructions, in response to execution by the receiving device, may further cause the receiving device to process the retrieved portion of data to enable display of the content item corresponding to the portion of data, and provide the content item corresponding to the processed portion of data for display. The instructions, in response to execution by the receiving device, may further cause the receiving device to identify the portion of data based on an identifier associated with the content item and included in the multicast data unit. The receiving device may include at least one of a display monitor, a laptop, or a tablet computer.

According to various embodiments, the present disclosure describes a computing device comprising a processor and a multiple content data combination application that may be operated by the processor to form a multicast data unit with multiple portions of data, each portion of data corresponding to one of multiple content items to be transmitted to multiple receiving devices by the computing device, each content item to be displayed by one of the multiple receiving devices, transmit the formed multicast data unit to the multiple receiving devices, and initiate, at each receiving device of the multiple receiving devices, a retrieval from the multicast data unit a portion of data that corresponds to a content item to be displayed by the receiving device, and to display the content item. The multiple content data combination application may be further configured to cause the computing device to identify each of the multiple receiving devices. The multiple content data combination application may be further configured to identify content items to be correspondingly displayed by the multiple receiving devices.

According to various embodiments, the present disclosure describes a computer-implemented method that may comprise: forming, with a computing device, a multicast data unit with multiple portions of data, each portion of data corresponding to one of multiple content items to be transmitted to multiple receiving devices by the computing device, each content item to be displayed by one of the multiple receiving devices; transmitting, with the computing device, the formed multicast data unit to the multiple receiving devices; and initiating, with the computing device, at each receiving device of the multiple receiving devices, a retrieval from the multicast data unit a portion of data that corresponds to a content item to be displayed by the receiving device, and to display the content item. The method may further comprise: identifying, with the computing device, each of the multiple receiving devices; and identifying, with the computing device, content items to be correspondingly displayed by the multiple receiving devices.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. An apparatus for computing comprising:
a computer processor and a memory; and
a multicast module, coupled to the computer processor and the memory, to form a multicast data unit, wherein to form the multicast data unit, the multicast module is to identify a first content item to be rendered by a first receiving device and a second content item to be rendered by a second receiving device, determine a first identifier of the first receiving device and a second identifier of the second receiving device, determine a first segment of the first content item and a first segment of the second content item, form the multicast data unit comprising a header and the first segment of the first content item and the first segment of the second content item, wherein the header comprises the first identifier associated with a first segment offset and the second identifier associated with a second segment offset, and transmit the multicast data unit to the first and second receiving devices;
wherein determine the first identifier of the first receiving device and the second identifier of the second receiving device comprises conduct a handshake procedure with each receiving device, wherein during the handshake procedure, the receiving devices authenticate or register with the multicast module and establish a unique identifier with respect to each receiving device, wherein the first and second identifiers are in a set comprising the unique identifier with respect to each device.

2. The apparatus according to 1, wherein the first and second content items are not the same.

3. The apparatus according to claim 1, further comprising a multicast reception module coupled to the first receiving device to receive and render one of the first or second segments, wherein to receive and render the one of the first or second segments, the multicast reception module is to receive the multicast data unit and determine one of the first or second segments to render according to an association between the first receiving device and the first or second identifier.

4. The apparatus according to 3, wherein the association is created during the handshake procedure.

5. The apparatus according to 1, wherein the first segment offset identifies where in the multicast data unit the first segment begins and wherein the second segment offset identifies where in the multicast data unit the second segment begins.

6. The apparatus according to 1, wherein identify the first content item to be rendered by the first receiving device and the second content item to be rendered by the second receiving device comprises receive a first user selection of the first content item and a second user selection of the second content item.

7. The apparatus according to 1, further comprising at least one of i) wherein transmit the multicast data unit to the first and second receiving devices comprises transmit the multicast data unit to the first and second receiving devices at least in part over a wireless communication network, ii) wherein form the multicast data unit comprising the header and the first segment of the first content item and the first segment of the second content item further comprises combine the first segment of the first content item and the first segment of the second content item based on a network coding function, iii) wherein the header further specifies a number of segments of content items in the multicast data unit, or iv) wherein transmit the multicast data unit to the first and second receiving devices comprises transmit by user datagram protocol ("UDP") streaming.

8. A method for a computing system, comprising: identifying, by the computing system, a first content item to be rendered by a first receiving device and a second content item to be rendered by a second receiving device; determining, by the computing system, a first identifier of the first receiving device and a second identifier of the second receiving device; determining, by the computing system, a first segment of the first content item and a first segment of the second content item; forming, by the computing system, a multicast data unit comprising a header and the first segment of the first content item and the first segment of the second content item, wherein the header comprises the first identifier associated with a first segment offset and the second identifier associated with a second segment offset, and means to transmit the multicast data unit to the first and second receiving devices;
wherein the first and second content items are not the same and wherein determining the first identifier of the first receiving device and the second identifier of the second receiving device comprises conducting a handshake procedure with each receiving device to establish a unique identifier with respect to each receiving device, wherein the first and second identifiers are in a set comprising the unique identifier with respect to each device.

9. The method according to claim 8, further comprising, at the first receiving device, determining one of the first or second segments to render according to an association between the second receiving device and the first or second identifier.

10. The method according to 9, wherein the association is created during the handshake procedure.

11. The method according to 8, wherein the first segment offset identifies where in the multicast data unit the first segment begins and wherein the second segment offset identifies where in the multicast data unit the second segment begins.

12. The method according to 8, wherein identifying, by the computing system, the first content item to be rendered by the first receiving device and the second content item to be rendered by the second receiving device comprises means to receiving, by the computing system, a first user selection of the first content item and a second user selection of the second content item.

13. The method according to 8, further comprising at least one of i) wherein transmitting, by the computing system, the multicast data unit to the first and second receiving devices comprises transmitting, by the computing system, the multicast data unit to the first and second receiving devices at least in part over a wireless communication network, ii) wherein forming, by the computing system, the multicast data unit comprising the header and the first segment of the first content item and the first segment of the second content item further comprises combining, by the computing system, the first segment of the first content item and the first segment of the second content item based on a network coding function, iii) wherein the header further specifies a number of segments of content items in the multicast data unit, or iv) wherein transmitting, by the computing system, the multicast data unit to the first and second receiving devices comprises means to transmit by user datagram protocol ("UDP") streaming.

14. At least one non-transitory computer device-readable storage medium comprising instructions stored thereon wherein the instructions, in response to execution by a computer device, cause the computer device to: identify a first content item to be rendered by a first receiving device and a second content item to be rendered by a second receiving device, determine a first identifier of the first receiving device and a second identifier of the second receiving device, determine a first segment of the first content item and a first segment of the second content item, form a multicast data unit comprising a header and the first segment of the first content item and the first segment of the second content item, wherein the header comprises the first identifier associated with a first segment offset and the second identifier associated with a second segment offset, and transmit the multicast data unit to the first and second receiving devices;
wherein the first and second content items are not the same.

15. The non-transitory computer device-readable storage medium according to 14, wherein determine the first identifier of the first receiving device and the second identifier of the second receiving device comprises conduct a handshake procedure with each receiving device, wherein during the handshake procedure, the receiving devices authenticate or register with the multicast module and establish a unique identifier with respect to each receiving device, wherein the first and second identifiers are in a set comprising the unique identifier with respect to each device.

16. The non-transitory computer device-readable storage medium according to 14, wherein the first segment offset identifies where in the multicast data unit the first segment begins and wherein the second segment offset identifies where in the multicast data unit the second segment begins.

17. The non-transitory computer device-readable storage medium according to 14, wherein identify the first content item to be rendered by the first receiving device and the second content item to be rendered by the second receiving device comprises receive a first user selection of the first content item and a second user selection of the second content item.

18. The non-transitory computer device-readable storage medium according to 14, further comprising at least one of i) wherein transmit the multicast data unit to the first and second receiving devices comprises transmit the multicast data unit to the first and second receiving devices at least in part over a wireless communication network, ii) wherein form the multicast data unit comprising the header and the first segment of the first content item and the first segment of the second content item further comprises combine the first segment of the first content item and the first segment of the second content item based on a network coding function, iii) wherein the header further specifies a number of segments of content items in the multicast data unit, or iv) wherein transmit the multicast data unit to the first and second receiving devices comprises transmit by user datagram protocol ("UDP") streaming.

19. At least one non-transitory computer device-readable storage medium comprising instructions stored thereon wherein the instructions, in response to execution by a computer device, cause the computer device to: establish a first identifier of the computer device with a remote computer device, receive a multicast data unit from a remote computer device, wherein the multicast data unit comprises a header, a first segment of a first content item and a first segment of a second content item, wherein the header comprises the first identifier associated with a first segment offset and a second identifier associated with a second segment offset, retrieve the first segment of the first content item in the multicast data unit based on the first identifier and the first segment offset, and render the first segment of the first content item in the multicast data unit;
wherein the first segment offset identifies where in the multicast data unit the first segment begins and wherein the second segment offset identifies where in the multicast data unit the second segment begins.

20. The non-transitory computer device-readable storage medium according to 19, wherein the first and second content items are not the same.

21. The non-transitory computer device-readable storage medium according to 19, wherein the computer device is to apply a network coding function to distinguish the first segment of the first content item from the first segment of the second content item and is to retrieve the first segment of the first content item based on the first identifier and the first segment offset.

* * * * *

UNITED STATES PATENT AND TRADEMARK OFFICE
CERTIFICATE OF CORRECTION

PATENT NO. : 10,149,119 B2
APPLICATION NO. : 15/234950
DATED : December 4, 2018
INVENTOR(S) : Jerry C. Wang et al.

Page 1 of 1

It is certified that error appears in the above-identified patent and that said Letters Patent is hereby corrected as shown below:

In the Specification

Column 15 Lines 23-24, "...comprises means to receiving,..." should read – "...comprises receiving,..."

Signed and Sealed this
Nineteenth Day of February, 2019

Andrei Iancu
*Director of the United States Patent and Trademark Office*